Figure 1:
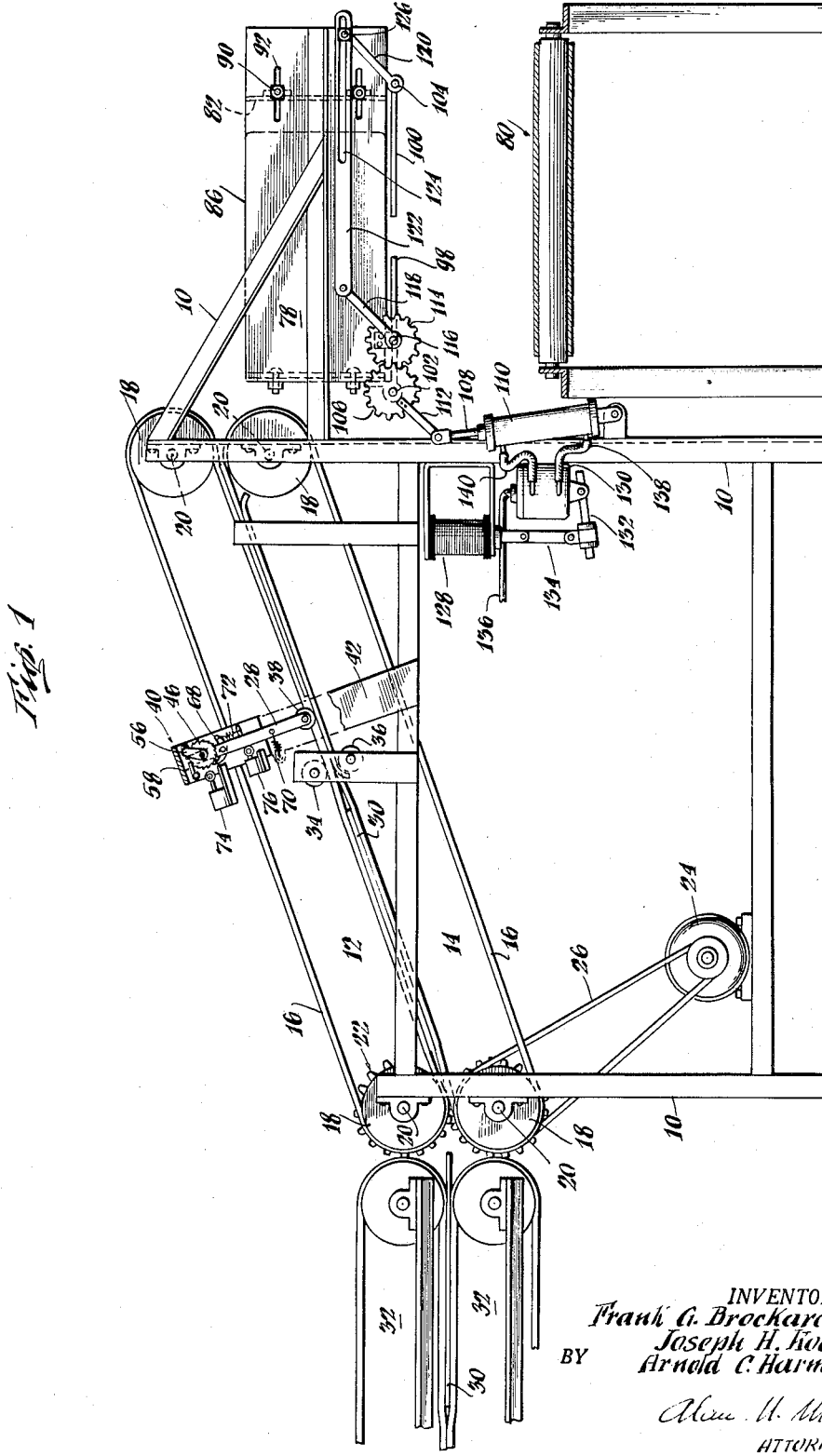

Nov. 15, 1955   F. G. BROCKARDT, JR., ET AL   2,723,606
BAG COUNTING MECHANISM

Filed May 25, 1950   5 Sheets-Sheet 1

INVENTORS
Frank G. Brockardt, Jr.
Joseph H. Koch
BY Arnold C. Harmsen.

ATTORNEY

Nov. 15, 1955   F. G. BROCKARDT, JR., ET AL   2,723,606
BAG COUNTING MECHANISM
Filed May 25, 1950   5 Sheets-Sheet 2
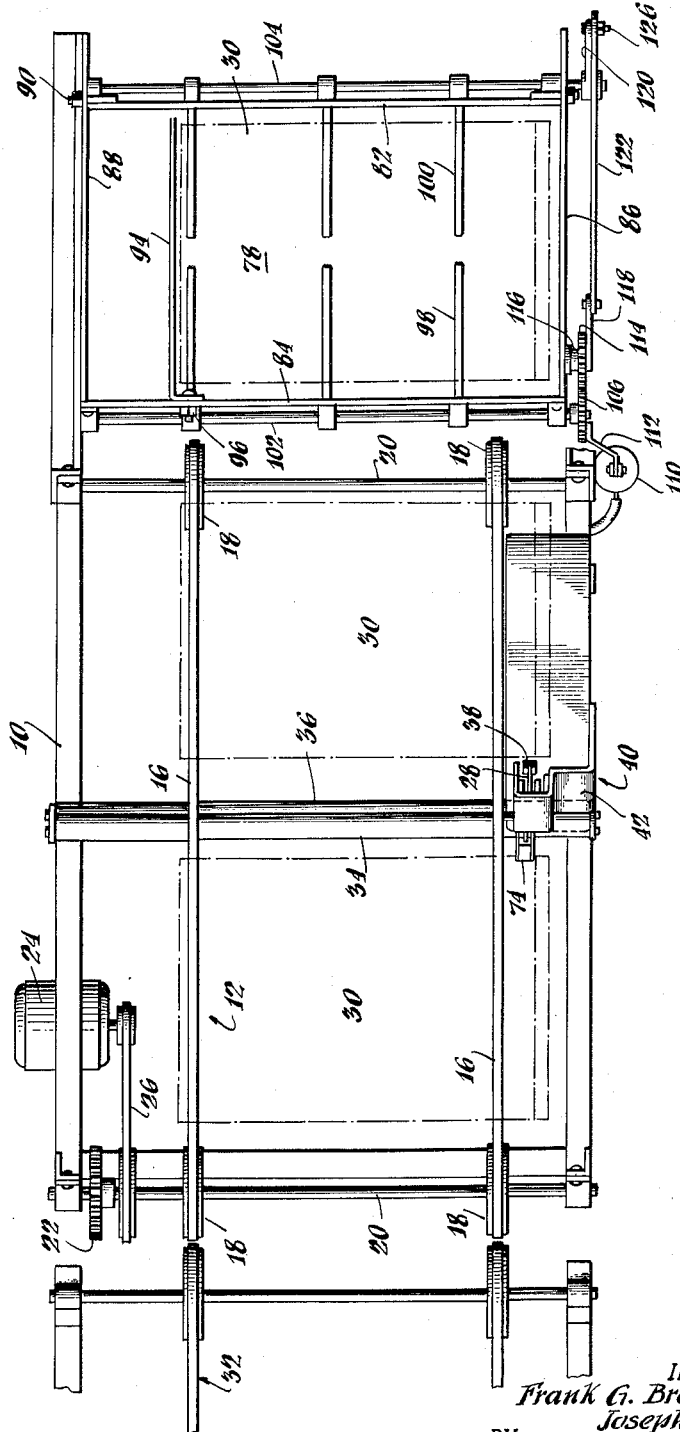

Nov. 15, 1955  F. G. BROCKARDT, JR., ET AL  2,723,606
BAG COUNTING MECHANISM
Filed May 25, 1950  5 Sheets-Sheet 3
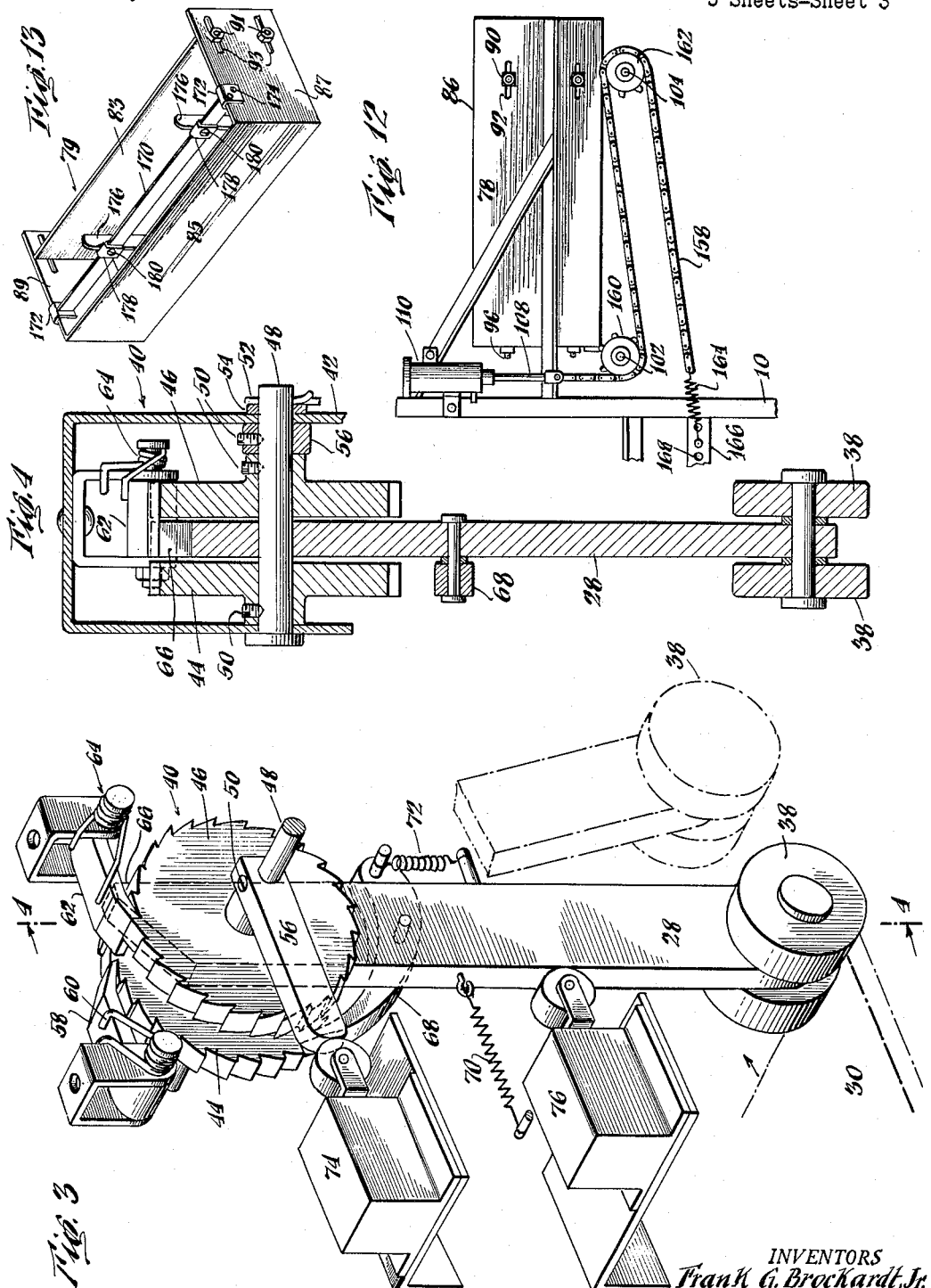
INVENTORS
Frank G. Brockardt, Jr.
Joseph H. Koch
Arnold C. Harmsen
BY
Alan M. Mann
ATTORNEY Nov. 15, 1955  F. G. BROCKARDT, JR., ET AL  2,723,606
BAG COUNTING MECHANISM
Filed May 25, 1950  5 Sheets-Sheet 4
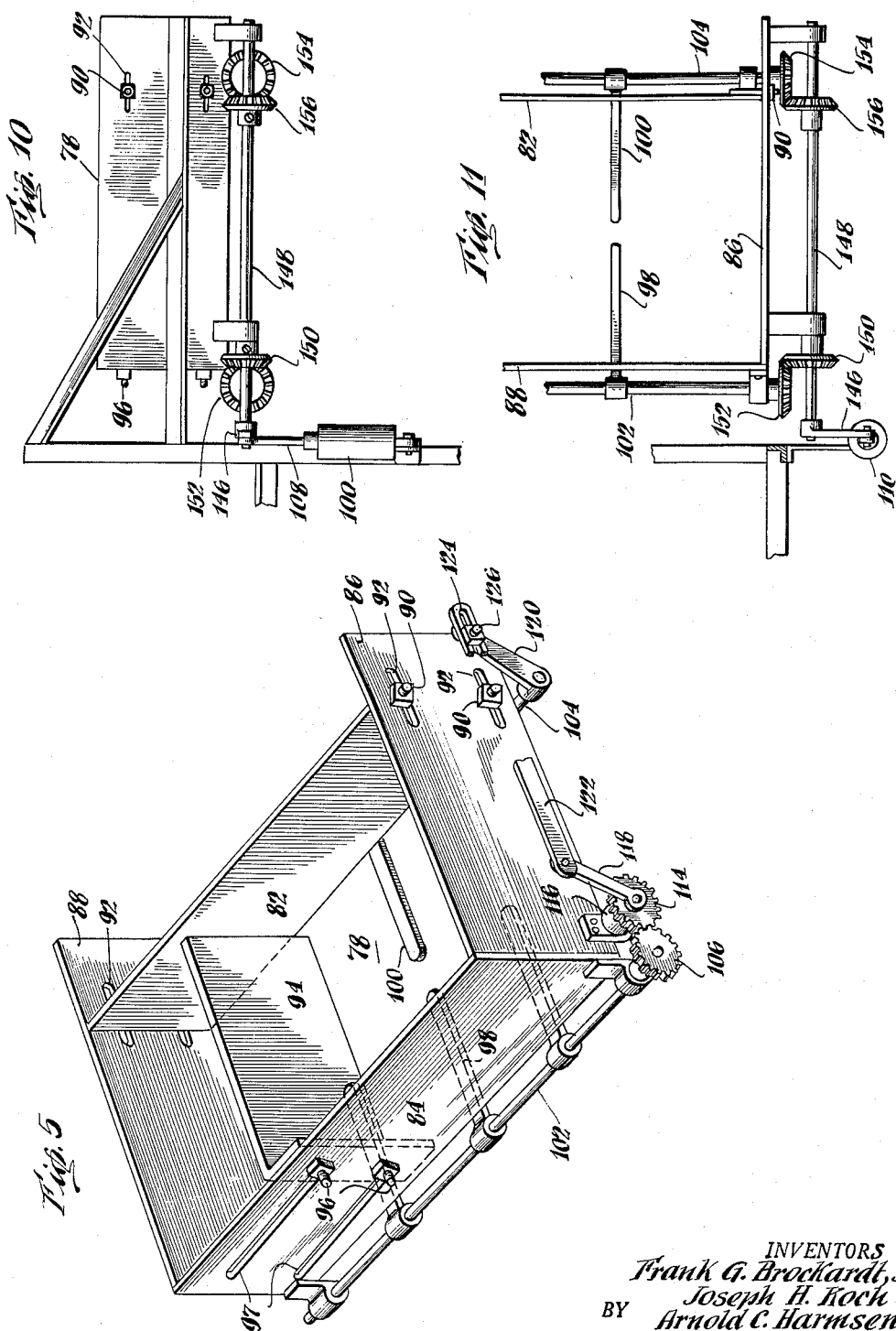
INVENTORS
Frank G. Brockardt, Jr.
Joseph H. Koch
BY Arnold C. Harmsen
ATTORNEY Nov. 15, 1955  F. G. BROCKARDT, JR., ET AL  2,723,606
BAG COUNTING MECHANISM
Filed May 25, 1950
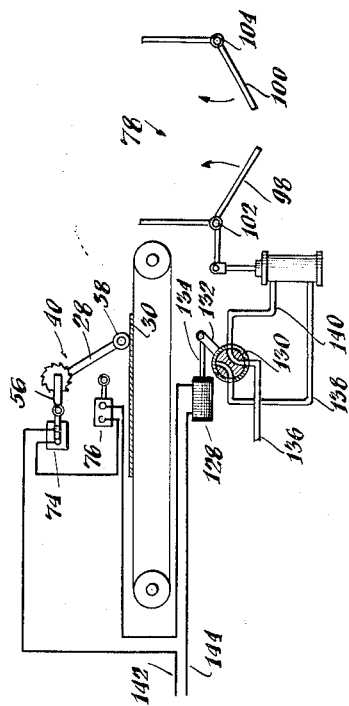
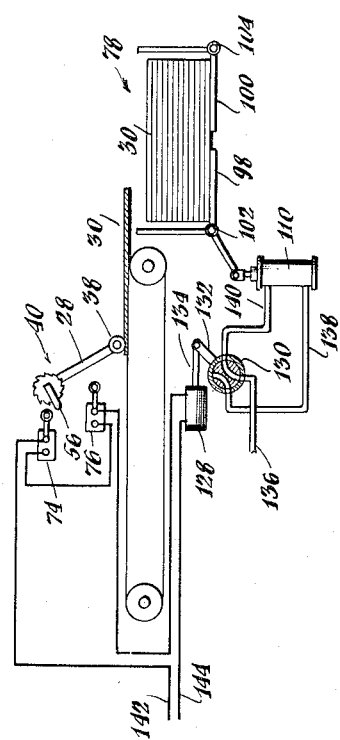
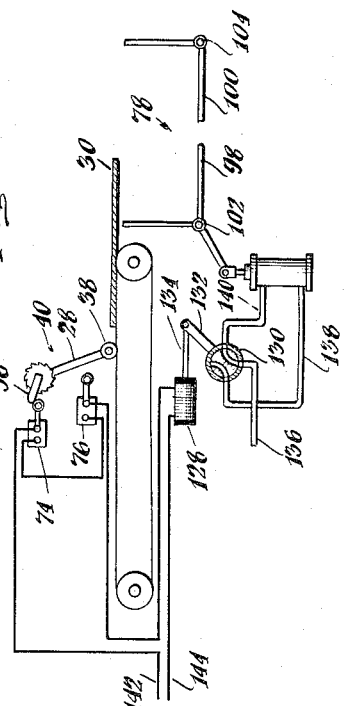
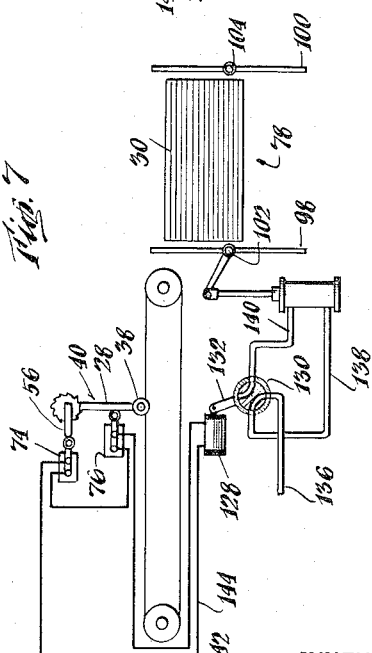
INVENTORS
Frank G. Brockardt, Jr.
Joseph H. Koch
BY Arnold C. Harmsen
ATTORNEY

United States Patent Office 2,723,606
Patented Nov. 15, 1955

2,723,606

BAG COUNTING MECHANISM

Frank G. Brockardt, Jr., and Joseph H. Koch, Wheeling, and Arnold C. Harmsen, Wellsburg, W. Va., assignors to Arkell and Smiths, a corporation of New York Application May 25, 1950, Serial No. 164,224

2 Claims. (Cl. 93—93)

This invention relates to a machine used for counting and stacking paper bags into units of a predetermined number. These units are then dropped upon a conveyor or the like.

In the present invention we provide a machine which catches paper bags from a conveyor, counts and stacks a certain quantity and places the counted unit upon a moving conveyor ready for packaging. This machine has a simple and economical construction and it has been shown in operation that the bags are counted accurately and neatly stacked in individual units by mechanical means without the necessity of manual counting and stacking.

To this end, in our invention the paper bags are carried to a hopper by a pair of pinching conveyors, each bag being counted by tripping a counter lever placed in the bag's path. When this lever is tripped it rotates a ratchet counter one tooth space for each bag, with a predetermined number of teeth in the ratchet counter limiting the number of bags in a unit. After rotating through this predetermined number of tooth spaces, a counting cycle is completed and an electrical circuit closes energizing a solenoid which controls the air supply to a piston which in turn opens the gates of the hopper. This releases the bags and drops them neatly stacked in a unit upon a moving conveyor. The hopper gates are then closed when the circuit is opened by the leading edge of a subsequent bag tripping the counter lever. At this time the counter assembly starts a counting cycle for another bag unit.

While in this specification the illustrated counting cycle calls for the ratchet counter making one complete revolution, it is obvious that the electrical circuit may be adapted to close after rotation through a segment of the ratchet counter to provide several counting cycles for each revolution. To make innumerable combinations of these counting cycles possible, we have designed ratchet counters which can be easily removed so that the simple expedient of replacing them gives our invention an extraordinarily flexible range of counting operation.

This invention can readily be understood by reference to the accompanying drawings in which Fig. 1 is a side elevational view of our invention; Fig. 2 is a top plan view of the conveyors and hopper; Fig. 3 is a perspective view of the counter assembly; Fig. 4 is a side elevational view of the counter assembly; Fig. 5 is a perspective view of the hopper; Figs. 6 to 9 are diagrammatic views illustrating the cycle of operation; Figs. 10 to 13 illustrate modifications of the present invention.

In the machine illustrated the various members are mounted in frame 10 and include a pair of pinching conveyors 12 and 14 formed with belts 16 carried by pulleys 18. The pulleys mounted on shafts 20 are driven at the same speed through gearing indicated at 22 (see Fig. 1). Any suitable source of power may be used to drive the conveyors such as electric motor 24 and belt 26 shown in Fig. 1. The normal operating speed of the conveyors is equal to that at which bags are ordinarily formed in manufacture. This speed is not critical but it may not exceed the speed at which trip lever 28 operates. After the bags 30 are formed, conveyors 32 start them through pinching conveyors 12 and 14. These pinching conveyors are squeezed together at the center by idlers 34 and 36 to aid in holding the bags for contact with rollers 38 of counter trip lever 28.

The bag count is taken by counter assembly 40 positioned on a support member 42 in frame 10 so that rollers 38 of trip lever 28 will be engaged by each passing bag. Within this counter assembly, ratchet counters 44 and 46 (see Fig. 3) are mounted on countershaft 48 with the teeth in ratchet counter 44 being oppositely disposed relative to the teeth in counter 46. The ratchet counters and countershaft may be held in position by any desirable means that facilitate their removal. For this purpose, we show in Fig. 4 set screws 50 and cotter pin 52 with washer 54 holding the ratchet counters and countershaft respectively. Switch arm 56 is mounted on the countershaft so that it will rotate in unison with the ratchet counters. Dog 58 is held in contact with the teeth of ratchet counter 44 by spring 60 so as to prevent counter-clockwise movement of the counters, but upon clockwise movement, the dog slides freely over the teeth. A similar dog 62 is held in contact with ratchet counter 46 by spring 64 preventing clockwise movement while in contact. Trip lever 28 also mounted on countershaft 48 is adapted to rotate freely thereon. A cam 66 which engages dog 62 and lifts it with forward movement of lever 28 is formed by the upper end of this lever.

Thus, as a bag strikes rollers 38, trip lever 28 is moved from position shown in full lines Fig. 3 to the position shown in dotted lines. Pawl 68, pivotally mounted on lever 28, snaps over the teeth of ratchet counter 44 and cam 66 lifts dog 62. Rollers 38 drop off the trailing edge of the bag and trip lever 28 is drawn rearwardly by spring 70. During the rearward movement pawl 68, held in contact with the teeth of ratchet counter 44 by spring 72, rotates the ratchet counters in a clockwise direction. The form of cam 66 is such that when the counters have rotated one tooth space, dog 62 is dropped into contact with ratchet counter 46 to insure that the counters and switch arm 56 will be moved only through the distance of one tooth space for each bag. So constructed, the dogs eliminate all drifting and overtravel of the ratchet wheels which enables taking an accurate count.

Switches 74 and 76 mounted on counter assembly support 42 are connected in series and both must be closed to complete the electrical circuit which operates hopper 78. Switch 76 is closed each time a bag passes through the device by trip lever 28 when dog 62 contacts ratchet counter 46 stopping the lever's rearward movement. Switch 74 is closed only when a bag unit is completed.

As the count is taken for the last bag of a unit, switch arm 56 closes switch 74. For example, with a ratchet counter having twenty-five teeth, each bag will rotate the counter one tooth space or one-twenty-fifth of a turn and the ratchet counter will make one complete revolution or cycle for each unit of twenty-five bags. Since switch arm 56 rotates in unison with the ratchet counters, it is in position to close switch 74 only once during the counting cycle, i. e., when the last or twenty-fifth bag in a unit passes trip lever 28. When both switches 74 and 76 are closed, the electrical circuit is completed and the hopper opens to drop the twenty-five-bag unit in a stack on conveyor 80. The leading edge of the subsequent bag swings lever 28 forward to open switch 76 and break the circuit whereby hopper 78 closes to catch this first bag of a new unit.

This switch arrangement is particularly advantageous because each bag, by opening switch 76, breaks the electrical circuit independently of the ratchet counters, thus insuring that the hopper gates will be closed to receive the bag after it has passed counter trip lever 28. This lends great flexibility to my device in that it is possible to increase the counting cycles for each revolution of the ratchet counters with additional switch arms or cams without the necessity of changing other working parts in the counter assembly. Added flexibility is achieved with the simple expedient of removing set screws 50 and cotter pin 52 and by sliding shaft 48 free of the counter assembly, the ratchet counters may be easily replaced with a new set having a different number of teeth. As a result, innumerable combinations of counting cycles are possible which gives our invention an extraordinarily flexible range of counting operation.

Hopper 78 is supported by frame 10 so as to receive bags 30 from the pinching conveyors 12 and 14. As shown in Fig. 5, the hopper preferably is rectangular, with a movable wall 82 and three stationary walls 84, 86 and 88. Side wall 82 is adjustably mounted by bolts 90 fitted to slots 92 in end walls 86 and 88. Side wall 84 carries an adjusting panel 94 mounted by bolts 96 in slots 97. Thus the size of the hopper may be changed to correspond with the size of the counted bags.

The gates of hopper 78 are formed by inwardly extending fingers 98 and 100 which are mounted on shifts 102 and 104 respectively. In the design illustrated in Fig. 1 shaft 102 is provided with a gear 106 which is connected to piston rod 108 of pneumatic cylinder 110 by an arm 112. A gear 114 mounted on stub shaft 116 is positioned to mesh with gear 106 and arm 118 extended from gear 114 is connected to arm 120 on shaft 104 by link 122. The link is provided with an elongated slot 124 through which it is connected to arm 120 by bolt 126 and arm 120 is adjustable with shaft 104 which is carried by movable wall 82. As this wall is adjusted to correspond to the size of the bags, shaft 104 is moved with wall 82 and bolt 126 is moved in slot 124.

The hopper gates are opened by switches 74 and 76 which open and close the electrical circuit to solenoid 128. The solenoid actuates air valve 130 through lever 132 and links 134 to control air under pressure from an air supply line 136 into double-acting air cylinder 110 with the air supplied to opposite ends thereof through tubes 138 and 140.

After the last bag of a unit is counted, switch 74 closes the electrical circuit energizing solenoid 128 and the solenoid sets valve 130 so that air under pressure is supplied through tube 138 to the lower end of cylinder 110. A piston in the cylinder is forced upward moving piston rod 108 which rotates the gears 106 and 114. This drops gates 98 and 100. The leading edge of the next bag opens switch 76 and breaks the circuit to solenoid 128 whereby the solenoid reverses valve 130 so that air under pressure is supplied through tube 140 to the upper end of cylinder 110. As a result, the piston is returned and gates 98 and 100 are rotated upwardly into the horizontal or closed position.

This cycle of operations is illustrated in Figs. 6 to 9 in which Fig. 6 shows the positions of the parts with the counting lever held by the trailing edge of the last bag in a unit and with air pressure applied to the upper end of cylinder 110 to hold the gates in closed position. In Fig. 7 the lever has dropped from the last bag and with the closing of switch 74 the solenoid has actuated valve 130 to supply air at the lower end of cylinder 110. The gates open and drop the stack or unit of bags from the hopper. In Fig. 8 the first bag of the next batch has released switch 76 and the solenoid has actuated the valve to supply air pressure to the upper end of the cylinder so that the gates are closing. In Fig. 9 the gates are closed and the first bag is ready to drop into the hopper.

The circuit may be connected to any suitable source of current and as illustrated in these drawings, power may be supplied through main line connections 142 and 144. As shown in Fig. 6, wire 142 extends through switches 74 and 76 to solenoid 128 connecting them in series. Conventional switches of the spring plunger variety are illustrated, but any suitable switch may be used.

In the modification illustrated in Figs. 10 and 11 the gates of the hopper are actuated through beveled gears with the gears rotated by pneumatic cylinder 110. In Fig. 11 we show the connection of the cylinder with the bevel gearshaft. Piston rod 108 is pivotally connected to the outer end of shaft 148 by arm 146 (see Fig. 11) and a beveled gear 150 on the shaft is positioned to mesh with a similar gear 152 on shaft 102 which carries gates 98 of the hopper. Shaft 104 is provided with a beveled gear 154 which meshes with a similar gear 156 on shaft 148 so that when shaft 148 is rotated by cylinder 110 through arm 146, gates 98 and 100 are opened and closed.

In the mechanism illustrated in Fig. 12, cylinder 110 is connected by piston rod 108 and chain 158 to the gate shafts 102 and 104 of hopper 78. The shafts are rotated by sprockets 160 and 162 respectively. Chain 158 is drawn in one direction by the cylinder and in the opposite direction by a spring 164 to open and close the gates of the hopper. The outer end of the spring is connected to frame 10 by a bracket 166 which is provided with a plurality of spaced bolt holes 168 through which the end of spring 164 is adjustably connected.

In the modification illustrated in Fig. 13 hopper 79 is drawn to reduced scale and the gates with their operating mechanism are not shown. Hopper 79 preferably is rectangular, with a movable wall 83 and three stationary walls 85, 87 and 89. Side wall 83 is adjustably mounted by bolts 91 fitted to slots 93 in end walls 87 and 89. End walls 87 and 89 also carry a sliding bar 170 mounted by brackets 172 and set screws 174. Fingers 176 are adjustably mounted on sliding bar 170 by brackets 178 and set screws 180. Thus by adjusting the position of sliding bar 170 and movable wall 83 the bag's center line, parallel to end wall 83, remains in the same vertical plane for different sized bags. Fingers 176 may also be adjusted to hold the bag's center line which is parallel to side wall 87 in the same vertical plane so that each stack of bags may be perfectly centered on conveyor 80.

It will be understood that it is intended to cover all changes and modifications of the preferred embodiment of the invention herein chosen for the purpose of illustration which do not constitute departures from the spirit and scope of the invention.

What we claim is:

1. The combination of a pair of pinching conveyors to feed bags, a hopper to receive the bags having gates mounted therein, each gate being adapted to oscillate about a fixed axis to form the hopper bottom, a counter assembly, a pair of switches in said assembly, electrically controlled means adapted to open said gates when both switches are closed and to close said gates when either switch is open, a trip lever pivotally mounted in said assembly adapted to swing forward with each bag, said trip lever being further adapted to open one of said switches as it swings forward with each bag and to close such switch after contacting the bag, means adapted to be actuated by said trip lever for closing the second switch after a specified number of bags have contacted said lever, whereby the hopper gates are opened after a specified number of bags have contacted the trip lever and closed by the leading edge of a succeeding bag contacting said lever.

2. A machine for counting and stacking paper bags comprising means for conveying bags, a hopper to receive the bags having gates rotatively mounted therein to form the hopper bottom, a counter assembly adapted to be actuated by each bag, a pair of switches, electrically controlled means for opening said gates when both switches are closed and for closing the gates when either switch is open, and means within said assembly adapted to close both of said switches after a specified number of bags have actuated the counter assembly and to open one of said switches when the counter assembly is actuated by the next succeeding bag of a new unit whereby the gates are opened after a specified number of bags are collected in the hopper and closed to catch the first bag of a new unit.

References Cited in the file of this patent

UNITED STATES PATENTS

| | | |
|---|---|---|
| 927,080 | Sargent et al. | July 6, 1909 |
| 1,318,910 | Pfohl | Oct. 14, 1919 |
| 1,365,741 | Speer | Jan. 18, 1921 |
| 1,409,187 | La Bombard | Mar. 14, 1922 |
| 1,600,958 | Hart et al. | Sept. 31, 1926 |
| 1,943,500 | Winkler et al. | Jan. 16, 1934 |
| 2,414,059 | Powers | Jan. 7, 1947 |
| 2,424,093 | Harred | July 15, 1947 |

FOREIGN PATENTS

| | | |
|---|---|---|
| 291,215 | Great Britain | May 31, 1928 |